O. A. AND E. F. TAEGE.
AUTOMOBILE JACK.
APPLICATION FILED OCT. 4, 1918.
1,319,934.
Patented Oct. 28, 1919.
3 SHEETS—SHEET 1.
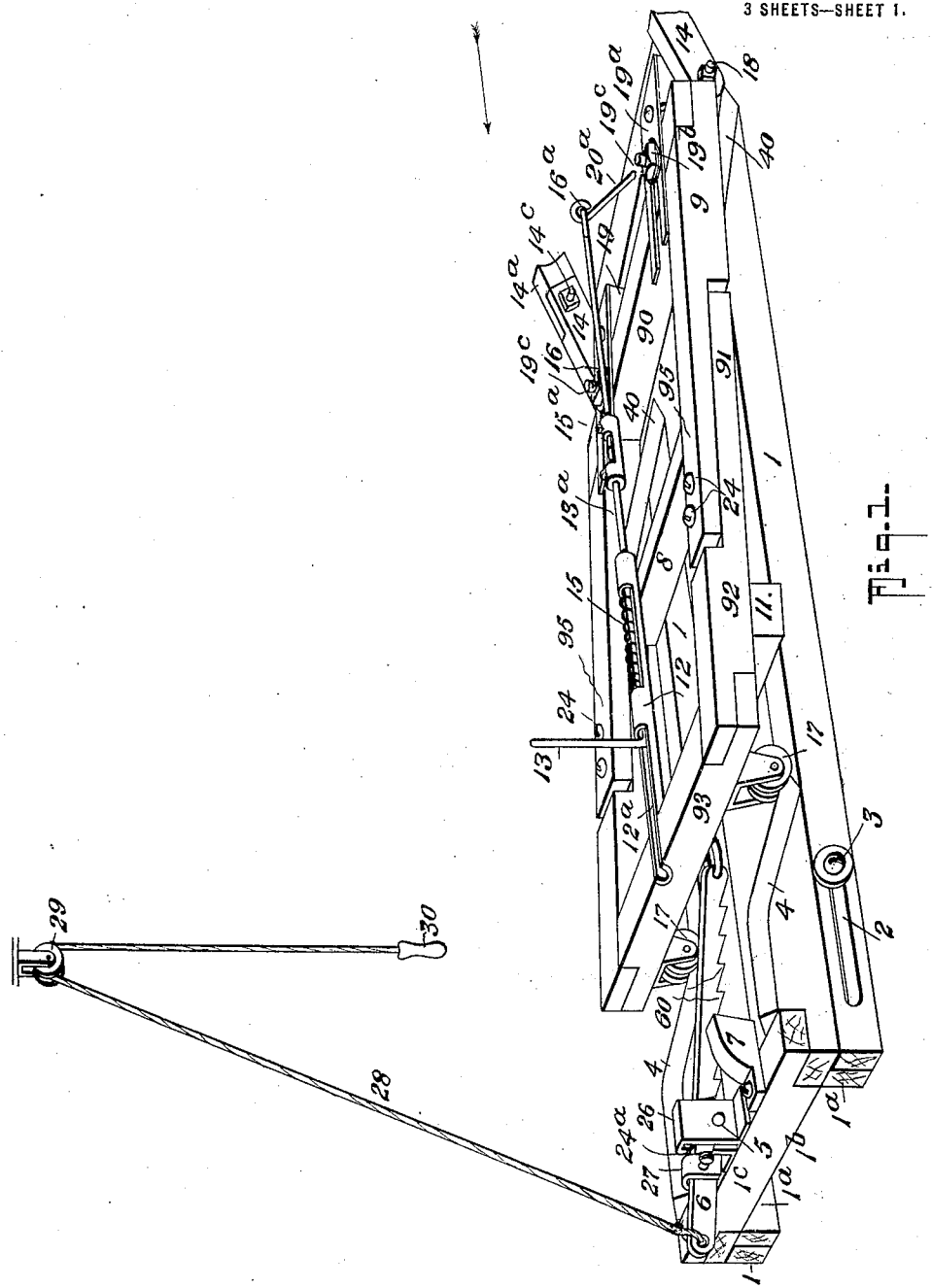
INVENTOR
Otto A. Taege
Edward F. Taege
BY
Fred G. Dieterich
ATTORNEYS

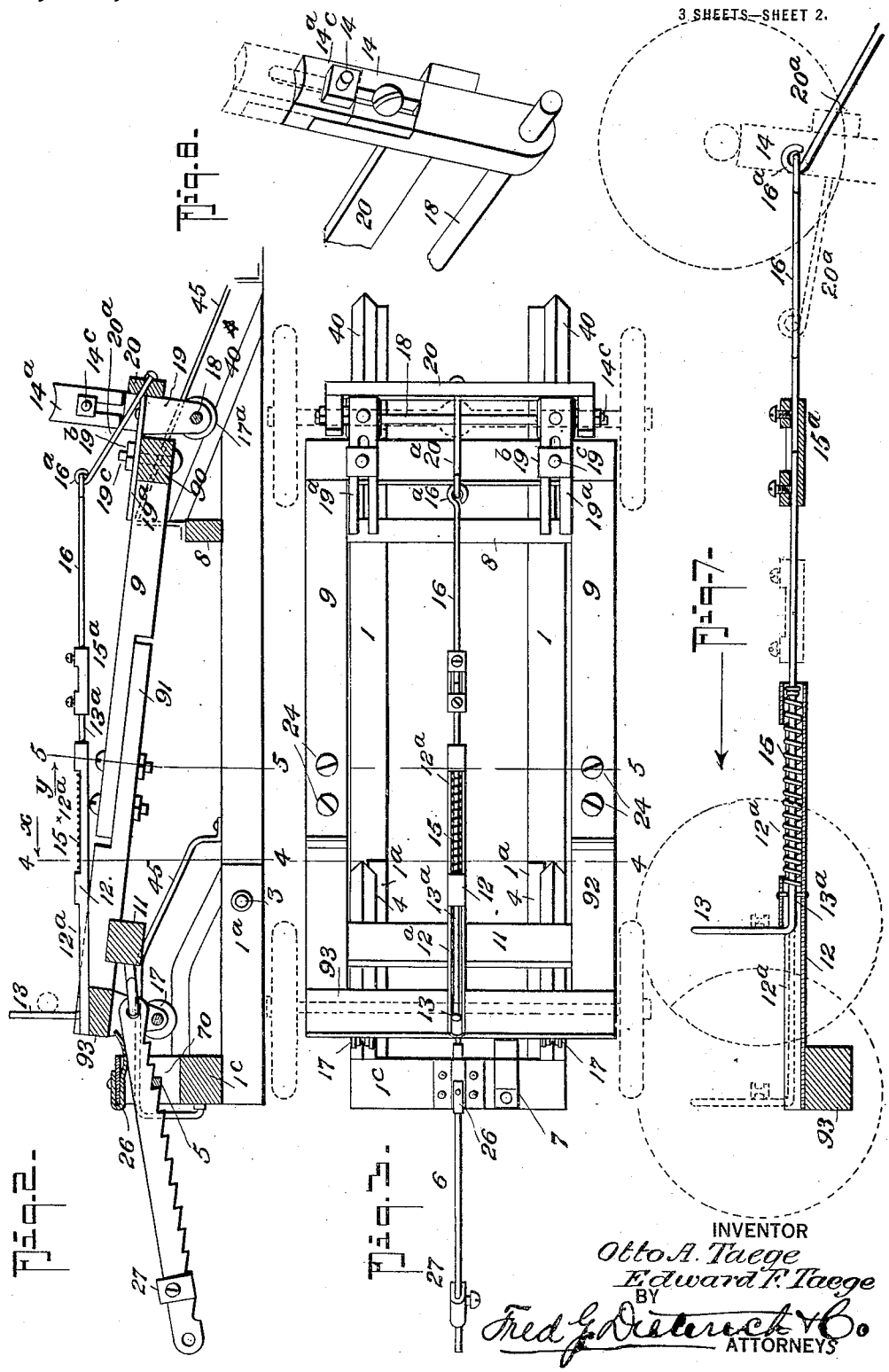

O. A. AND E. F. TAEGE.
AUTOMOBILE JACK.
APPLICATION FILED OCT. 4, 1918.
1,319,934.
Patented Oct. 28, 1919.
3 SHEETS—SHEET 3.
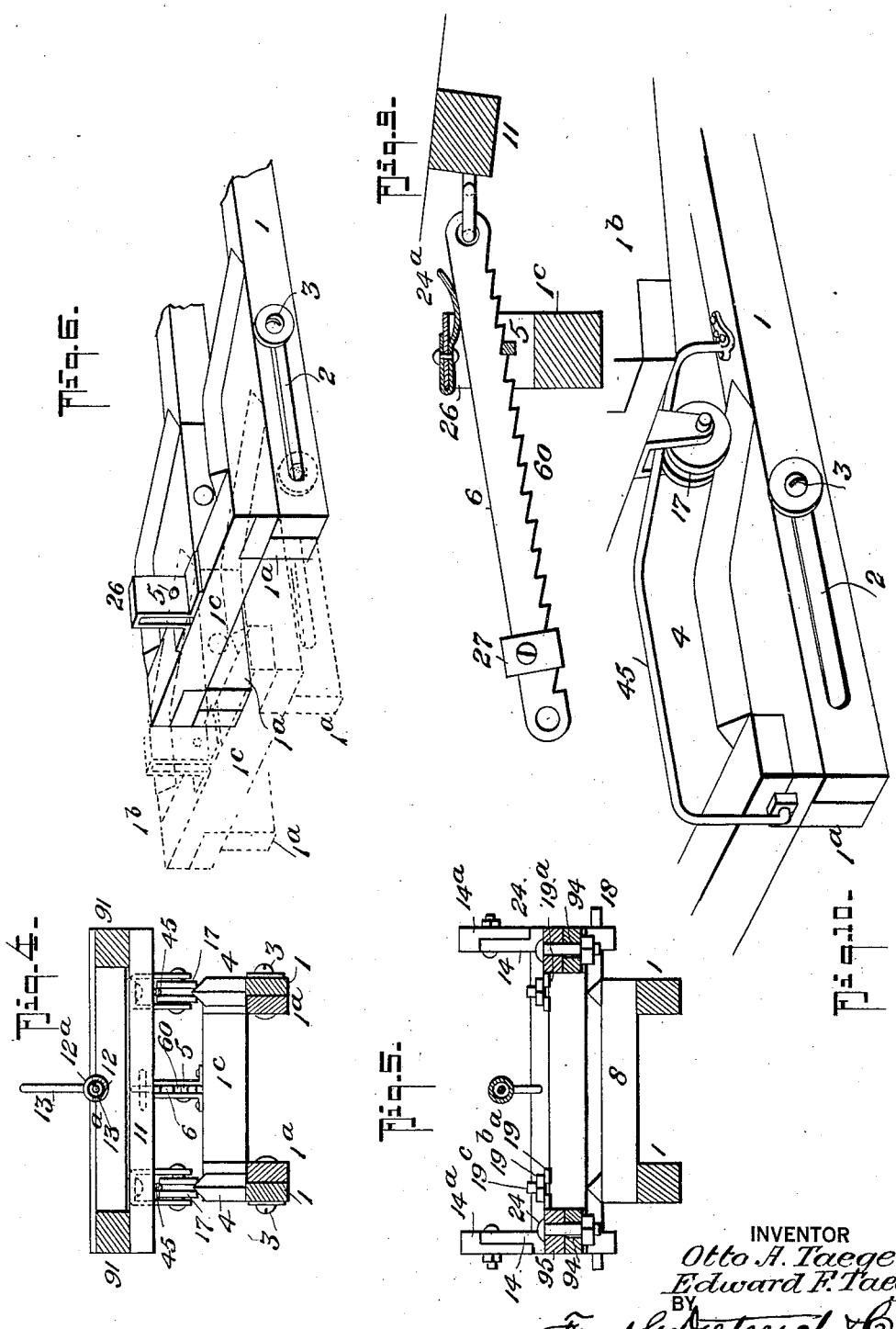
INVENTOR
*Otto A. Taege*
*Edward F. Taege*
BY
*Fred G. Dieterich & Co*
ATTORNEYS

UNITED STATES PATENT OFFICE.

OTTO A. TAEGE AND EDWARD F. TAEGE, OF SEWARD, NEBRASKA.

AUTOMOBILE-JACK.

1,319,934. Specification of Letters Patent. Patented Oct. 28, 1919.

Application filed October 4, 1918. Serial No. 256,818.

*To all whom it may concern:*

Be it known that we, OTTO A. TAEGE and EDWARD F. TAEGE, citizens of the United States, residing at Seward, in the county of Seward and State of Nebraska, have invented certain new and useful Improvements in Automobile-Jacks, of which the following is a specification.

Our invention has particular reference to improvements in automatically operated automobile jacks of that type having a lifting frame that is longitudinally movable under the impelling force of the automobile as it drives onto the jack, and which have roller bearings on the movable frame for engaging inclined runways, whereby to lift the vertically movable jack frame.

Among other objects our invention seeks to provide an improved construction of automobile jack having a locking means that automatically operates to hold the lifting frame to its vertically adjusted position, when the motor vehicle has shifted it to such position and which includes an improved arrangement of pawl and ratchet devices and a ratchet releasing means adapted for being positioned directly adjacent the driver's seat of the "jacked-up" car and which may be conveniently operated by the driver while on the seat and when he wishes to drive the car from the garage.

In its more complete nature our present invention seeks to provide an improved motor vehicle jack in which simple provision is made for readily adjusting the framing to suit different lengths of cars and in which the rear axle sustaining means is vertically adjustable, whereby to adapt the said means for use in connection with cars of different types.

With the above objects in view, our invention consists in the peculiar combination and novel arrangement of the parts to be hereinafter fully explained, specifically stated in the appended claims and illustrated in the accompanying drawings, in which:

Figure 1 is a perspective view of our improved automobile jack, the lifting frame being at the lowered or normal position.

Fig. 2 is a longitudinal section thereof, the lifting frame being shown as having been forced to the lifting position under the impelling movement of the motor when driven thereover.

Fig. 3 is a plan view of our vehicle jack mechanism, the lifting frame being shown as positioned at the limit of its forward thrust, the front and rear axle of a motor vehicle being indicated in dotted lines.

Fig. 4 is a transverse section of our jack taken on the line 4—4 on Figs. 2 and 3 and looking in the direction of the arrow $x$.

Fig. 5 is a similar view taken on the line 5—5 on Figs. 2 and 3, see arrow $y$.

Fig. 6 is a perspective view of the rear or longitudinally adjustable end of the main or base frame.

Fig. 7 is a detail longitudinal section of the cushion abutment with which the front axle of the vehicle engages and which is flexibly connected with the rear axle support hereinafter to be explained.

Fig. 8 is a perspective view of one of the said rear axle supports.

Fig. 9 is a longitudinal section of the locking rack arm and the detent that coöperates therewith.

Fig. 10 is a detail perspective view that illustrates the keeper or restraining means for the rollers 17 hereinafter referred to.

In carrying out our invention, a main or base frame is provided for resting flatwise on the carriage floor and the said frame comprises opposite side bars 1—1, the rear ends of which have horizontal elongated slots 2—2 for receiving the clamp bolts 3—3 to which the members $1^a$—$1^a$ of the longitudinally adjustable portion $1^b$ of the base frame connect and the said adjustable portion of the frame includes a cross bar $1^c$ to which a stop block 7 is secured for keeping the car from running over the jack as will hereinafter be more fully explained.

The side frame members $1^a$—$1^a$ have inclined track-rails 4 $\Lambda$ shaped in cross section and similar track-rails 40—40 are mounted on the forward ends of the side bars 1—1, as shown. Brace members 8—8 connect with the side bars and add strength to the base frame.

The upper or lifter frame is also of rectangular shape and has longitudinal adjustment, whereby to adapt it for use for different lengths of machines.

The lifter frame consists of a front half section which includes a cross bar 90 and side bars 9—9 undercut at the ends 95 to receive the like undercut end 91 of the side bars 92—92 of the rear half section of the said frame, the latter half section including a cross bar 93 and a supplemental cross bar 11, the function of which will presently appear.

The ends 91 of the rear half section of the lifter frame have elongated slots 94—94 to receive clamp bolts 24—24 which take through the coincident ends 95—95 of the bars 9—9 and such arrangement of parts provides for conveniently adjusting the length of the lifting frame to suit the particular type or length of vehicle to be jacked-up.

6 designates a long locking bar that is provided on its under edge with ratchet teeth 60 arranged for engagement with a detent, the latter being in the nature of a cross bolt 5 that joins the opposite members of a combined guide and keeper bracket 26 mounted on the cross member of the adjustable or rear end of the base frame, as is clearly shown in Fig. 9 and for holding the ratchet teeth 60 in a locked engagement with the detent 5, a spring $24^a$ is mounted in the guide 24 to bear on the upper edge of the ratchet bar 6, as shown.

27 designates an adjustable stop which is secured to the ratchet bar 6 and it operates to limit the backward movement of the lifter frame, when it is returned to the lower or normal position, as presently explained.

17—17 designate grooved rollers journaled in brackets attached to the underside of the rear cross bar 93 of the lifter frame and the said rollers, when the parts are assembled for use, guide the forward travel of the lifter frame by riding up on the ∧ shaped track guides 4 on the adjustable or inner end of the main or base frame.

A pair of brackets 19—19 are attached to the front cross bar of the lifter frame, as is best shown in Figs. 1, 2 and 3, from which it will be seen each of the said brackets includes a ⊓ shaped member, the upper end of which is integrally formed with or otherwise attached to a slotted guide $19^a$. In practice the slotted guide is longitudinally adjustable and is secured to its adjusted positions by the clamp nut and bolt devices $19^b$—$19^c$.

18 designates a shaft that extends across the front end of the lifter frame and which journals in the brackets 19—19. The said shaft carries grooved rollers $17^a$, one between each ⊓ shaped portion of the brackets, and the said rollers $17^a$ coöperate with and travel upon the inclined trackways 4 at the front end of the main frame.

A lifter arm 14 is fixedly secured on each end of the shaft 18 and each of the said lifter arms 14 includes an extensible outer member $14^a$ that is adjustably attached to the arm 14 proper by clamp bolts $14^c$. The two arms 14—14 are joined by a cross bar 20.

12 is a tubular guide that is horizontally mounted on the rear end of the lifter frame and extends lengthwise thereof. The said guide has a longitudinal slot $12^a$ in the upper face thereof which constitutes a slideway for the abutment 13 against which the front axle of the motor cars strikes, when the said car is driven over the jack and which pulls the said lifter frame backwardly under the impelling force of the moving car.

In our construction of automobile jack, the abutment 13 is a yieldable member to avoid undue shocks when the front axle is driven up against it.

In the drawings, we have shown a cushioning spring 15 that takes around the rod $13^a$ with which the abutment 13 is fixedly connected and which is endwise slidable in the tube 12 and extends through the forward end of the said tube. The spring 15 connects, at one end, to the tube 12 and, at the other end to the rod $13^a$, the connection being such that, when the vehicle front axle passes up against the abutment 13, it compresses and constitutes a cushion to take up the abutting shock and, when the vehicle backs off and leaves the said abutment, in expanding, the said spring 15 pushes the rod $13^a$ forwardly and thereby lowers the rear axle supporting arms 14—14, it being understood that the lock member 6 is at this time released.

The rod $13^a$ is adjustably connected, at the outer end, to a coupling tube $15^a$ to which is also adjustably connected another rod 16 which pivotally joins at $16^a$ to a crank arm $20^a$ that projects from the cross bar 20.

28 designates a pull rope that takes over an overhead pulley 29 and has one end connected to the outer end of the locking bar 6 and the other end provided with a pull handle 30 that hangs in condition for being easily grasped by the driver in the car that is held up by the jack.

From the foregoing description taken in connection with the accompanying drawings, the complete construction, the general operation, and the advantages of my invention will be readily apparent to those skilled in the art to which my said invention relates.

Briefly stated, when driving the motor car onto the jack, when the latter is positioned, as shown in Fig. 1, as the front axle of the car engages the abutment 13, the first effect of the vehicle impact is to push the rod $13^a$ back, thereby compressing the spring 15 and at the same time swinging the arms 14—14 up under the back axle of the car.

After the arms 14—14 have been swung up and the spring 15 compressed, further pressure on the abutment 13 will cause the rollers of the lifting frame to engage their respective inclined guide brackets 4—4 and also push the ratchet or lock bar 6 outwardly along the detent 5, it being understood that the bar 6 in its engagement with the detent 5, holds the lifter frame to its forwardly shifted and elevated position with the car raised from the floor.

When it is desired to back the car out of the garage, all that is necessary is for the driver to pull upon the overhead handle to cause the ratchet bar to lift out of its locked engagement with the detent 5 to free the lifter frame which then, together with the car, lowers to bring the wheels in contact with the floor.

To prevent the grooved rollers 17—17ª from leaving the ∧ shaped track rails 4—40, guard rails 45 may be provided for each of the said rails 4—40, and the said guard rails 45 may be arranged as shown on Fig. 2, and illustrated in detail by Fig. 10.

The guard rails 45 also tend to hold the rollers 17—17ª from lateral displacement as they ride upon the track incline, by having them positioned so the groove of the rollers engage them, as is clearly indicated in Figs. 4 and 10.

What we claim is:

1. In an automobile jack in which is included a stationary base frame and a lifter frame, and the said lifter frame and base frame formed with interengaging portions adapted to cause the lifter frame to rise as it is being impelled by the momentum of the vehicle passing over the jack, and locking devices for holding the lifter frame to its forwardly and upwardly shifted position, a yielding abutment attached to the lifter frame for being engaged by the front axle of an incoming vehicle, the yielding means operating to return the abutment back to the normal position, when the vehicle backs off and the lifter frame lowers, the said abutment including a longitudinally reciprocable member, and a pair of lifter arms pivotally attached to the front end of the lifter frame and connected with the said reciprocable member, the said arms being adapted for swinging upward under the rear axle of the vehicle, as the front axle engages and pushes the abutment forwardly.

2. In an automobile jack in which is included a longitudinally adjustable base frame and a longitudinally and vertically movable lifter frame, the said base frame and the lifter frame having coöperative members, whereby when the lifter frame is forwardly impelled, the said frame will rise up, means for locking the lifter frame to its forwardly impelled position, other means connected with the said locking means for being actuated by the occupant in the jacked-up vehicle for releasing the locking means, whereby to permit the lifter frame to move backwardly and lower the jacked-up vehicle and longitudinally adjustable arms pivotally mounted on the front end of the lifter frame and connected with the abutment and adapted as the abutment is pushed forwardly to swing under the rear axle of the incoming vehicle, and means for automatically returning the abutment to its normal position, when the vehicle backs off of the jack and the locking means are released.

OTTO A. TAEGE.
EDWARD F. TAEGE.

Copies of this patent may be obtained for five cents each, by addressing the "Commissioner of Patents, Washington, D. C."